United States Patent [19]

Boekkooi et al.

[11] 4,009,987

[45] Mar. 1, 1977

[54] ELECTRIC LAMP HAVING AN INTERNAL SWITCHING MECHANISM

[75] Inventors: Anton Boekkooi; Adrianus Antonius Hurx; Johannes Maria Josephus van Lieshout, all of Eindhoven, Netherlands

[73] Assignee: U.S. Philips Corporation, New York, N.Y.

[22] Filed: Oct. 10, 1975

[21] Appl. No.: 621,483

Related U.S. Application Data

[63] Continuation of Ser. No. 463,729, April 24, 1974, abandoned.

[30] Foreign Application Priority Data

May 1, 1973 Netherlands .................... 7306018

[52] U.S. Cl. .......................... 431/95 R; 431/95 A
[51] Int. Cl.² ............................................ F21K 5/02
[58] Field of Search ............... 431/93, 94, 95, 95 A

[56] References Cited

UNITED STATES PATENTS

| | | | |
|---|---|---|---|
| 3,459,488 | 8/1969 | Schroder et al. | 431/95 |
| 3,556,699 | 1/1971 | Takahashi et al. | 431/95 |
| 3,598,511 | 8/1971 | Ohmae | 431/95 |
| 3,768,957 | 10/1973 | VanDerTas et al. | 431/95 |
| 3,816,054 | 6/1974 | Baldrige, Jr. et al. | 431/95 |
| 3,897,196 | 7/1975 | Saunders et al. | 431/95 |
| 3,951,582 | 4/1976 | Holub et al. | 431/95 R |

*Primary Examiner*—John J. Camby
*Assistant Examiner*—Henry C. Yuen
*Attorney, Agent, or Firm*—Frank R. Trifari; Robert S. Smith

[57] ABSTRACT

A combustion flash lamp having a number of lead-in conductors in which two of the lead-in conductors are surrounded over a part of their length dimension by a metal sleeve which melts around said conductors as a result of the thermal energy released upon firing the lamp and interconnects them electrically. The lamp is suitable for use in a flash lamp cube in which the lamps can be fired one after the other.

4 Claims, 4 Drawing Figures

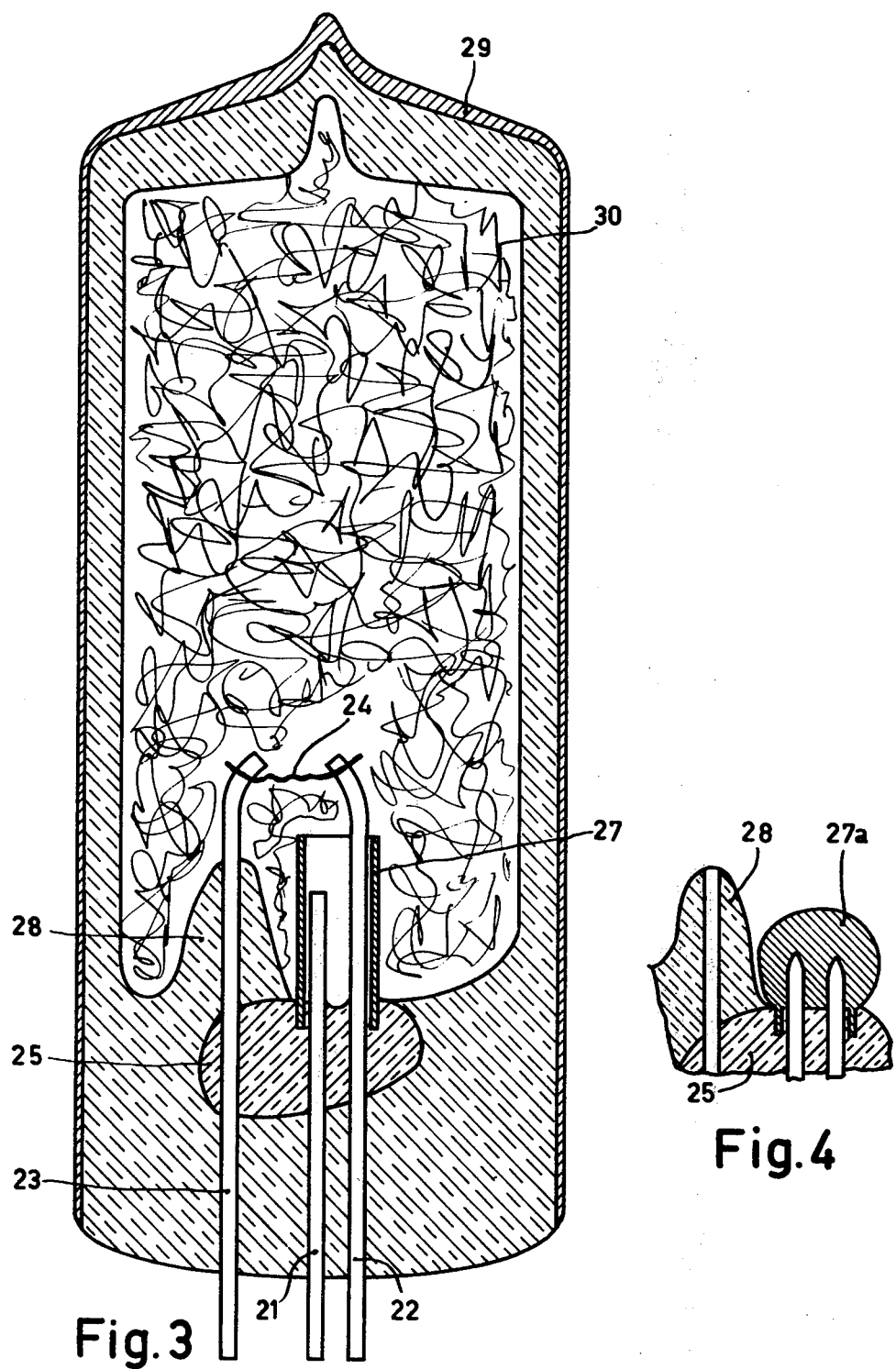

ELECTRIC LAMP HAVING AN INTERNAL SWITCHING MECHANISM

This is a continuation of application Ser. No. 463,729, filed Apr. 24, 1974, now abandoned.

The invention relates to an electric lamp, in particular a combustion flash lamp, having at least two lead-in conductors extending to in the lamp envelope, at least one of the conductors being connected in a place inside the lamp envelope to an ignition mechanism or the like, for example, a filament wire, the two conductors being surrounded over at least a part of their length dimension by a common mass of an electrically readily conducting material which melts as a result of the thermal energy released upon actuating and flashing of the lamp, respectively, and interconnects the enclosed conductors electrically. Such a lamp is known from the published German Patent Application No. 1,961,470. It is used in a flash lamp cube in which several combustion flash lamps are incorporated which can be fired one after the other. The known lamp is incorporated with its lead-in conductors in a switching circuit which is designed so that only after flashing one lamp can a subsequent lamp be fired. The thermal energy released during firing activates an internal fuse switch which connects the said conductors together electrically.

In the known lamp said switch is formed by a mass of an electrically readily conducting paste which surrounds the conductors which each have an electrically insulating, readily melting sheath. Said mass is melted by the thermal energy released during firing and the conductors are electrically connected together.

Several drawbacks are associated with the use of said fuse switch. First of all, careful measures should be taken in order that the conductors remain in an electrically insulated condition relative to each other prior to activating the fuse switch. Furthermore, the construction is so weak that the conductors in those places where they emerge from their bead can burn away together with the mass to be melted and land somewhere in the lamp envelope; a good electric interconnection is then obtained by no means. Furthermore, the process of introducing and dosing the paste in the correct plane inside the lamp cannot or hardly be mechanised.

It is the object of the invention to mitigate these drawbacks and to provide a lamp construction which is characterized in that the said member is a metal sleeve which surrounds the parts of the conductors remote from the heat source and which assumes a fixed position relative to said conductors, said sleeve being arranged so as to be electrically insulated relative to at least one of the conductors.

Several advantages are associated with the use of a metal sleeve. Such a sleeve can be fixed rather simply relative to the two enclosed conductors, for example, by connecting the sleeve to one of the conductors. Furthermore, such a connection can easily be carried out with a conventional machine for manufacturing bead sets. The mass of the sleeve required for a correct melting can be obtained by adapting the inside and outside diameters and the height dimension of the sleeve to the needs and can therefore be calculated beforehand. These sleeve dimensions will preferably be chosen to be so that after melting a solidified mass is obtained of a sufficient volume to obtain a good electric connection.

The sleeve can assume a fixed position relative to the conductors when it is secured to one of the conductors. This is useful, for example, for lamps in which the conductors are not held together by a common bead and in which the heat evolution in the lamp envelope occurs in a very controlled manner.

However, a preferred embodiment of the lamp according to the invention which is particularly suitable for use in combustion flash lamps is characterized in that the conductors are incorporated in a common bead, the sleeve being secured with its one end in said bead and assuming an electrically readily insulated position relative to the two conductors. Since the sleeve is incorporated in the bead with one of its ends, an efficient thermal dissipation may take place via the bead. On at least that part thereof which projects just beyond the bead, the sleeve remains intact and a part which is farther remote therefrom will melt with the conductors. As a result of the occurring surface tension, the melted part of the sleeve is connected to the rigid part of the sleeve which is secured in the bead. The melted material of the sleeve will not be swung into the lamp space. The part of the sleeve adjoining the bead also protects the conductors over their parts just projecting outside the bead. Since it is just these parts which are connected to melting sleeve material, a good electric interconnection is obtained at all times. It has been found that the lamp can be fired according to any desired position.

A further embodiment of the invention which is particularly suitable for combustion flash lamps which are incorporated in a flash lamp cube in which the lamps are fired one after the other by a suitable switching mechanism is characterized in that it comprises a third lead-in conductor which is arranged outside the sleeve and is electrically insulated relative to the sleeve, said third conductor and one of the conductors projecting through the sleeve being connected by one or more filament wires of the ignition mechanism. The third conductor to which the filament wire is connected loses its function when the filament wire fuses; as a result of the thermal energy released upon firing, the two other conductors are connected together electrically by the melting sleeve.

The invention furthermore provides an embodiment with which it is avoided that the third conductor which also melts entirely or partly upon flashing, contacts the sleeve or remaining parts thereof connected to the other conductors. This embodiment is characterized in that the third conductor is surrounded substantially throughout its length by an electric insulator of glass or enamel which remains insulating the surrounded conductor electrically relative to the sleeve upon firing.

The invention may be used in all cases in which it is desired to produce a rapid electric connection between conductors or the like in an electric lamp other than a combustion flash lamp by a suddenly occurring or excessive heat evolution.

However, it is particularly suitable for use in combustion flash lamps which are destined to be incorporated in a lamp unit which consists of a number of flash lamps which can be fired one after the other by means of a suitable circuit arrangement.

The invention will be briefly explained with reference to the drawing for a few embodiments, in which FIG. 1 is a combustion flash lamp having two lead-in conductors which are to be connected together electrically immediately after firing the lamp;

FIG. 3 shows a combustion flash lamp having three lead-in conductors which are to be connected together electrically immediately after firing the lamp;

FIG. 4 shows the connection result.

EMBODIMENT FIG. 1, 2

Figure 2:
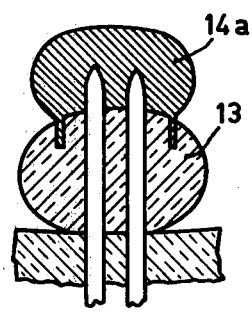
FIG. 2 shows the connection result.

The combustion flash lamp shown is substantially entirely of the conventional type. Inside the envelope 10 of glass there is a common bead formed from a bead 13 which unites lead-in conductors 11 and 12. Between said conductors is stretched a filament wire 15 of a conventional ignition mechanism. The lamp comprises a ball 16 of zirconium wool. The components as well as the gas filling of the lamp are of the conventional nature and the manufacture of the lamp takes place in a conventional manner. The lamp is suitable for being incorporated into a switching circuit as is described, for example, in the published Dutch Patent Application No. 6915056. For that purpose it comprises a mechanism for the electric interconnection of the conductors 11 and 12. This mechanism reacts to the thermal energy released upon firing the lamp. The circuit described in the said published Patent Application is designed so that the electric connection to the fired lamp is actually interrupted and a subsequent lamp is incorporated in the ignition circuit so as to be ready for firing. For that purpose, according to the invention said mechanism is formed as a metal sleeve 14 of copper which is locked in the bead 13. It assumes a fixed position relative to the two conductors. By applying a suitable voltage between the conductors 11 and 12, a paste present on the filament wire 15 is ignited and the combustion of the wool 16 in a suitable gas atmosphere inside the lamp is produced. As a result of the thermal energy released during said combustion, parts of the sleeve 14 and the interior parts of the conductors 11 and 12 melt. The result is a fuse which is shown in FIG. 2. The conductors 11 and 12 are electrically interconnected by means of the mass 14a.

EMBODIMENT FIG. 3, 4

Figure 1:
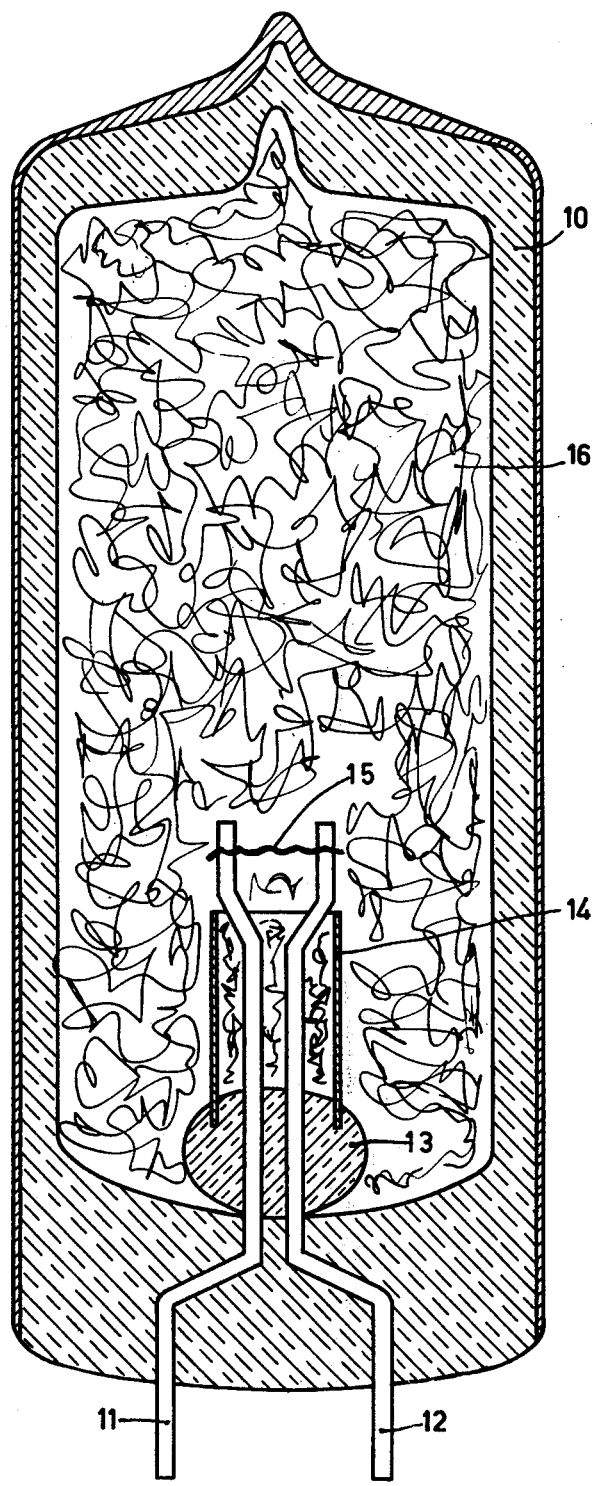

Principally, the lamp shown in these figures differs from that shown in FIGS. 1 and 2 only in so far that it comprises three lead-in conductors 21, 22, 23 instead of two conductors. Conductor 21 is an auxiliary conductor and a filament wire 24 with a suitable ignition paste is provided between the conductors 22 and 23. The bead which holds said conductors together is denoted by 25. The sleeve which is locked in the bead 25 is denoted by 27. In a manner analogous to that described with reference to FIGS. 1 and 2, the sleeve 27 is melted by the thermal energy released upon firing the lamp and that in such manner that the fuse shown in FIG. 4 is obtained. The two conductors 21 and 22 are electrically connected together. This lamp is suitable for incorporation in a circuit as described, for example, in the published German Patent Application No. 1,961,470. In order to be sure that after firing the conductor 23 has lost its function, said conductor should be provided with an electric insulator 28 of glass or enamel which upon firing remains insulating the conductor 23 electrically relative to the parts of the sleeve 27 melted to the conductors 21 and 22.

In the two embodiments the contents of the lamp are 0.6 ml, the filling is 20 mg of zirconium in an oxygen atmosphere of 700 cm mercury column and the conductors 11 and 12 are of nickel-plated copper sheath wire (0.4 mm diameter). The inside diameter and the outside diameter of the sleeve are 1.65 mm and 1.8 mm, respectively; the height of the sleeve is 3.5 mm.

Although a copper sleeve 14 (27) was always used in the embodiments, it is obvious that other materials may also be considered. The choice of the material depends to a considerable extent on the conductor material chosen. For example, nickel may be used when a fuse with lead-in conductors of molybdenum is to be produced.

What is claimed is:

1. A combustion flash lamp, having two lead-in conductors extending to the interior of the lamp envelope, at least one of the conductors being connected in a place inside the lamp envelope to means for igniting said conductors being completely surrounded over at least an axial part thereof by a common sleeve member of an electrically conducting material, said member including means for deforming to electrically connect said conductors responsive to heat resulting from the ignition of said lamp, said means including a material having a softening temperature lower than the normal temperature in said flash lamp during ignition, said softening temperature being the temperature at which said member will bend without the imposition of external forces, said member having a sleeve contour and disposed in axially spaced relation from said heat source, said sleeve having a fixed relationship relative to said conductors prior to firing, and disposed in spaced relationship to at least one of the conductors prior to firing.

2. A combustion flash lamp as claimed in claim 1, wherein said conductors are disposed in a common bead, said sleeve being secured with one end in said bead in spaced relationship to both of said conductors.

3. A combustion flash lamp as claimed in claim 2, wherein said means include a filament wire further including a third lead-in conductor which is disposed outside said sleeve in spaced relation to said sleeve, said third conductor and one of said two lead-in conductors being disposed within said sleeve being connected to said filament wire.

4. A combustion flash lamp as claimed in claim 3, wherein said third conductor is surrounded throughout a portion of its length by an electric insulator, said insulator insulating said third conductor electrically relative to said sleeve upon firing said lamp.

* * * * *

UNITED STATES PATENT AND TRADEMARK OFFICE
CERTIFICATE OF CORRECTION

PATENT NO. : 4009987
DATED : March 1, 1977
INVENTOR(S) : ANTON BOEKKOI ET AL

It is certified that error appears in the above-identified patent and that said Letters Patent are hereby corrected as shown below:

Column 1, line 44, "plane" should be --place--.

Signed and Sealed this

Seventeenth Day of May 1977

[SEAL]

Attest:

RUTH C. MASON
*Attesting Officer*

C. MARSHALL DANN
*Commissioner of Patents and Trademarks*